(12) United States Patent
Mathew et al.

(10) Patent No.: US 10,938,203 B2
(45) Date of Patent: Mar. 2, 2021

(54) VOLTAGE LIMITING DEVICE

(71) Applicant: NXP B.V., Eindhoven (NL)

(72) Inventors: Anu Mathew, Chandler, AZ (US);
Guido Wouter Willem Quax, Utrecht (NL)

(73) Assignee: NXP B.V., Eindhoven (NL)

( * ) Notice: Subject to any disclaimer, the term of this patent is extended or adjusted under 35 U.S.C. 154(b) by 212 days.

(21) Appl. No.: 16/173,898

(22) Filed: Oct. 29, 2018

(65) Prior Publication Data
US 2020/0136380 A1    Apr. 30, 2020

(51) Int. Cl.
*H02H 9/04* (2006.01)
(52) U.S. Cl.
CPC .................... *H02H 9/044* (2013.01)
(58) Field of Classification Search
CPC ................ H02H 9/044; H02H 9/046
USPC .......................................... 361/56
See application file for complete search history.

(56) References Cited

U.S. PATENT DOCUMENTS

| | | | |
|---|---|---|---|
| 6,738,242 B1* | 5/2004 | Kwong | H02H 9/046 361/56 |
| 2002/0130390 A1 | 9/2002 | Ker et al. | |
| 2004/0252426 A1* | 12/2004 | Hargrove | H01L 27/0255 361/56 |
| 2009/0251833 A1* | 10/2009 | Ochoa | H01L 27/0259 361/56 |
| 2009/0262474 A1 | 10/2009 | Farzan et al. | |
| 2011/0163352 A1* | 7/2011 | Gee | H01L 23/60 257/173 |
| 2016/0149402 A1 | 5/2016 | Ye et al. | |
| 2017/0324237 A1* | 11/2017 | Baumeler | H02H 9/045 |
| 2018/0062386 A1 | 3/2018 | Mallikarjunaswamy | |

* cited by examiner

*Primary Examiner* — Kevin J Comber

(57) ABSTRACT

One example discloses a voltage limiting device, including: a first I/O port; a second I/O port; a voltage limiter, coupled to the first and second I/O ports, and configured to shunt a voltage received on the first and/or second I/O ports having an absolute value greater than a voltage limit; wherein the voltage limiter includes a first portion and a second portion; wherein the first portion includes a first current shunt coupled between the first I/O port and a mid-net, and a second current shunt coupled between the second I/O port and the mid-net; and wherein the second portion includes a third current shunt having one end coupled to the mid-net and another end coupled to a ground.

22 Claims, 7 Drawing Sheets

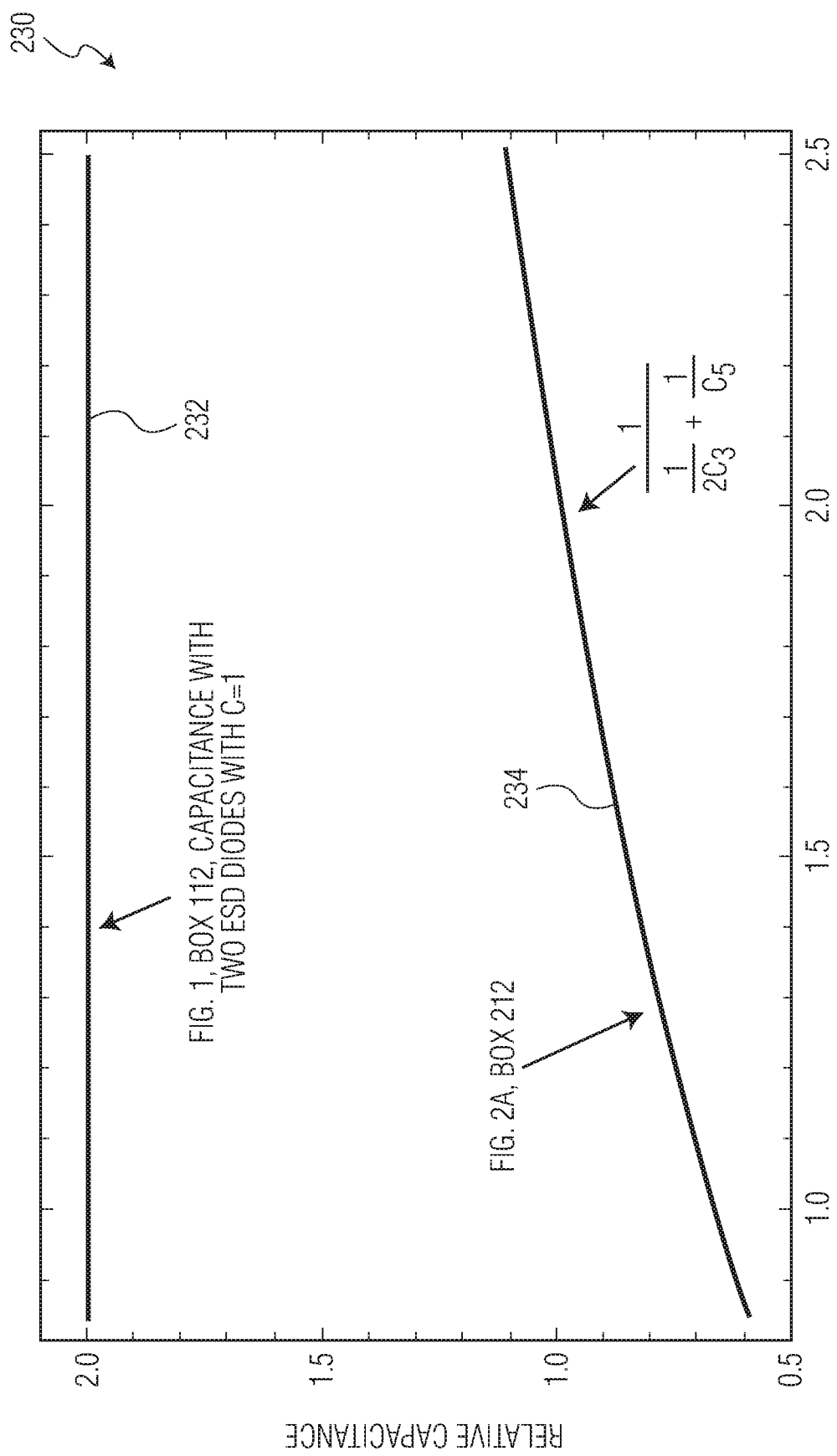

VOLTAGE LIMITING DEVICE

The present specification relates to systems, methods, apparatuses, devices, articles of manufacture and instructions for protecting circuits and connections between circuits.

SUMMARY

According to an example embodiment, a voltage limiting device, comprising: a first I/O port; a second I/O port; a voltage limiter, coupled to the first and second I/O ports, and configured to shunt a voltage received on the first and/or second I/O ports having an absolute value greater than a voltage limit; wherein the voltage limiter includes a first portion and a second portion; wherein the first portion includes a first current shunt coupled between the first I/O port and a mid-net, and a second current shunt coupled between the second I/O port and the mid-net; and wherein the second portion includes a third current shunt having one end coupled to the mid-net and another end coupled to a ground.

In another example embodiment, if the voltage received is a negative voltage with reference to the ground, then the voltage limiter is configured to shunt the negative voltage received if less than a negative voltage limit.

In another example embodiment, further comprising, another voltage limiter, coupled to the first and second I/O ports, and configured to shunt a positive voltage greater than a positive voltage limit received on the first and/or second I/O ports.

In another example embodiment, the voltage received is a positive voltage with reference to the ground; and the voltage limiter is configured to shunt the positive voltage received if greater than a positive voltage limit.

In another example embodiment, further comprising, another voltage limiter, coupled to the first and second I/O ports, and configured to shunt a negative voltage less than a negative voltage limit received on the first and/or second I/O ports.

In another example embodiment, the current shunts are diodes.

In another example embodiment, the current shunts are gate-grounded NMOS devices.

In another example embodiment, the current shunts are PNP ESD clamps.

In another example embodiment, the voltage limiting device is an electrostatic discharge (ESD) limiting device.

In another example embodiment, a minimum current carrying size of the current shunts is based on a minimum electrostatic discharge (ESD) protection level of the voltage limiting device.

In another example embodiment, the voltage limiter includes an equivalent capacitance based on a ratio of capacitances of the first portion of the voltage limiter to the second portion of the voltage limiter; and the ratio of capacitance is a monotonically increasing function with an increasing capacitance of the first portion.

In another example embodiment, a capacitance of the current shunt in the second portion of the voltage limiter is greater than capacitances of the current shunts in the first portion of the voltage limiter.

In another example embodiment, capacitances of the current shunts in the first portion of the voltage limiter are same; and a capacitance of the current shunt in the second portion of the voltage limiter is twice the capacitances of the current shunts in the first portion of the voltage limiter.

In another example embodiment, the first and/or second I/O port are configured to be embedded in a USB communications cable.

In another example embodiment, the first and/or second I/O port are configured to be coupled to a set of electronics to be protected from an electrostatic discharge (ESD) strike.

In another example embodiment, the first and second I/O ports are configured to carry bi-directional signals.

In another example embodiment, further comprising a negative voltage charge pump is coupled to the mid-net and configured to bias the mid-net with a negative voltage which reduces the capacitance of the voltage limiter.

In another example embodiment, further comprising a positive voltage charge pump coupled to the voltage limiter and configured to bias the voltage limiter with a positive voltage which reduces the capacitance of the voltage limiter.

In another example embodiment, further comprising a signaling switch configured to enable and disable communication signals between the first and second I/O ports.

In another example embodiment, at least one of the current shunts is a diode formed from an isolated P-well in the switch.

In another example embodiment, the signaling switch is a MOSFET and a gate of the MOSFET is configured to be opened when the received voltage is greater than the absolute value of the voltage limit; and the open gate is configured to create an additional current shunt for reducing the absolute value of the received voltage.

In another example embodiment, further comprising a floating body resistance coupled between the signaling switch and the ground.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 2C is an example comparison between an equivalent capacitance of the second voltage limiter in FIG. 2A, as a function of a capacitive ratio between capacitances therein.

Figure 1:
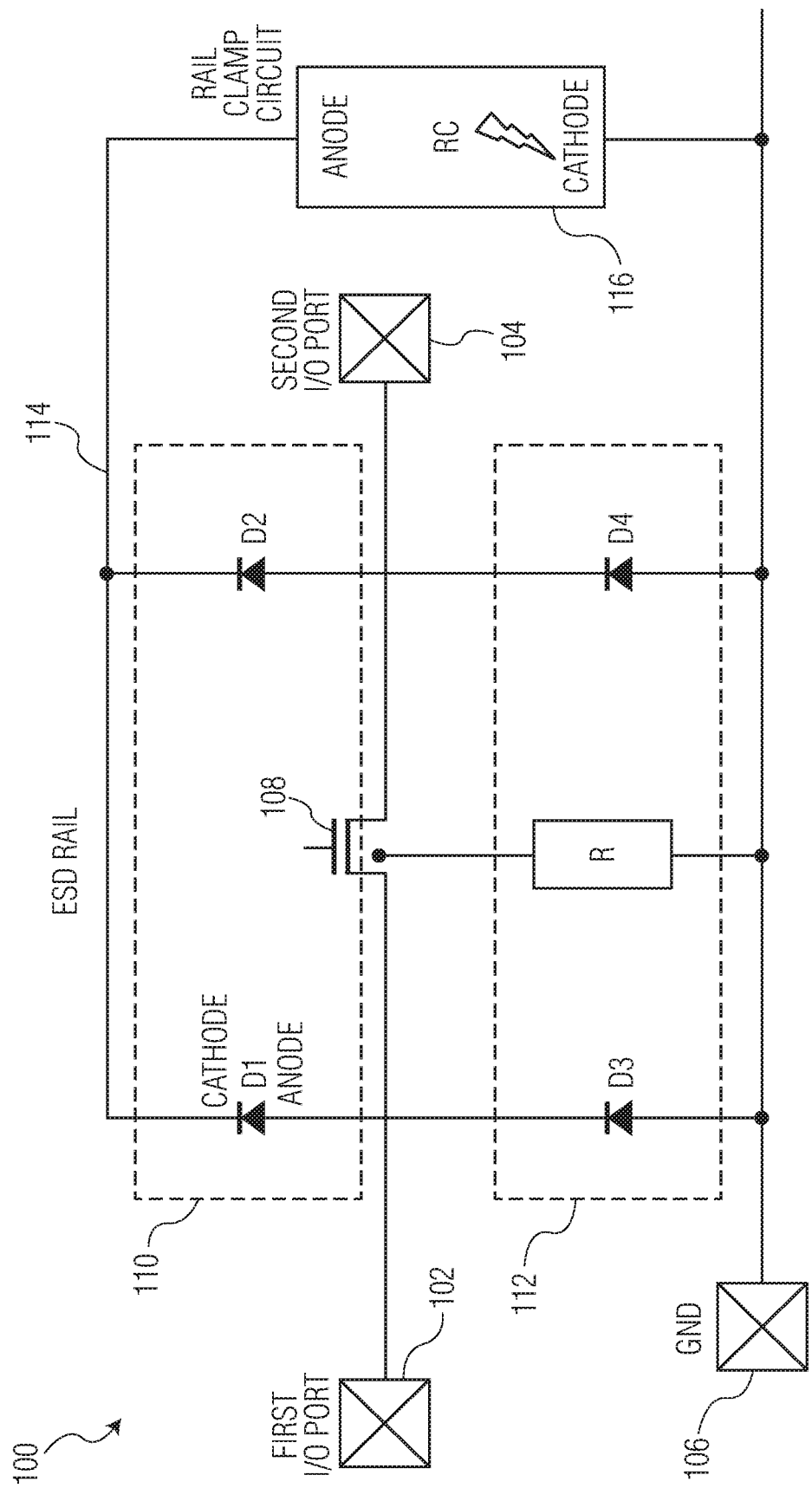
FIG. 1 is an example ESD circuit.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Electrostatic Discharge (ESD) circuits (e.g. diodes) are intended to protect sensitive electronics (e.g. System on Chip (SOC), semiconductor die, etc.) from various types of ESD events. Various over-voltage thresholds are set depending upon the application by one or more standards requirements.

For example, if electronics are placed next to an external connector and/or are embedded in a communications cable (e.g. up to +/−5V), then the ESD protection circuitry needs to be designed and configured properly, to limit the effects of an ESD event (e.g. well beyond +/−5V).

High-speed data communication applications (e.g. USB2, USB-Type C and Thunderbolt) having a higher bandwidth and higher return-loss (i.e. less signal reflection), can better alleviate major communications system bottlenecks, including Inter Symbol Interface(ISI), as well be better able to meet various stringent communications timing closures.

There however is a tension between meeting ESD standards requirements for cables and connectors and enabling high-speed data communications through such cables and connectors.

This is because various example ESD circuits can add capacitance loading (e.g. specifically from the ESD diodes) that may significantly limit the communications signal bandwidth and reduce the cable/connector return-loss.

FIG. 1 is an example ESD (Electrostatic Discharge) circuit 100. The ESD circuit 100 includes a first I/O port 102 (e.g. pin), a second I/O port 104, a ground (GND) 106, a signaling switch 108, a positive voltage limiter 110 (having a first diode (D1) and a second diode (D2)), a negative voltage limiter 112 (having a third diode (D3) and a fourth diode (D4)), an ESD Rail 114, a rail clamp circuit 116, and a charge pump circuit 118. The signaling switch 108 is bi-directional and is used for controlling communications between the I/O ports 102, 104 (e.g. for USB signaling applications). The ESD diodes D1, D2, D3, D4 protect the signaling switch 108 from ESD events/strikes.

When an over-threshold (e.g. ESD strike) positive GND referenced voltage is present on either the first or second I/O ports 102, 104, this positive voltage on the anode of diode D1 or D2 forward biases the diode D1 or D2 and thus discharges the over-threshold ESD voltage with current flowing through the ESD rail 114 to the AC or DC triggered rail clamp (RC) circuit 116 and then to ground (GND) 106.

When an over-threshold (e.g. ESD strike) negative GND referenced voltage is present on either the first or second I/O ports 102, 104, this negative voltage on the cathode of diode D3 or D4 forward biases the diode D3 or D4 and thus discharges the over-threshold ESD voltage with current from the ground (GND) 106.

However during some high-speed data communication operations, the junction capacitance associated with diode D3 and/or D4 adds in proportion more capacitance to the ESD circuit 100 than diodes D1 or D2. This reduces bandwidth and reduces return-loss.

Now discussed are example voltage limiting (e.g. ESD) circuits for high-speed data communications that both meet ESD standards requirements and maintain or increase signal bandwidth and have a higher return-loss by reducing the capacitance of the negative voltage limiter 112.

Figure 2A:
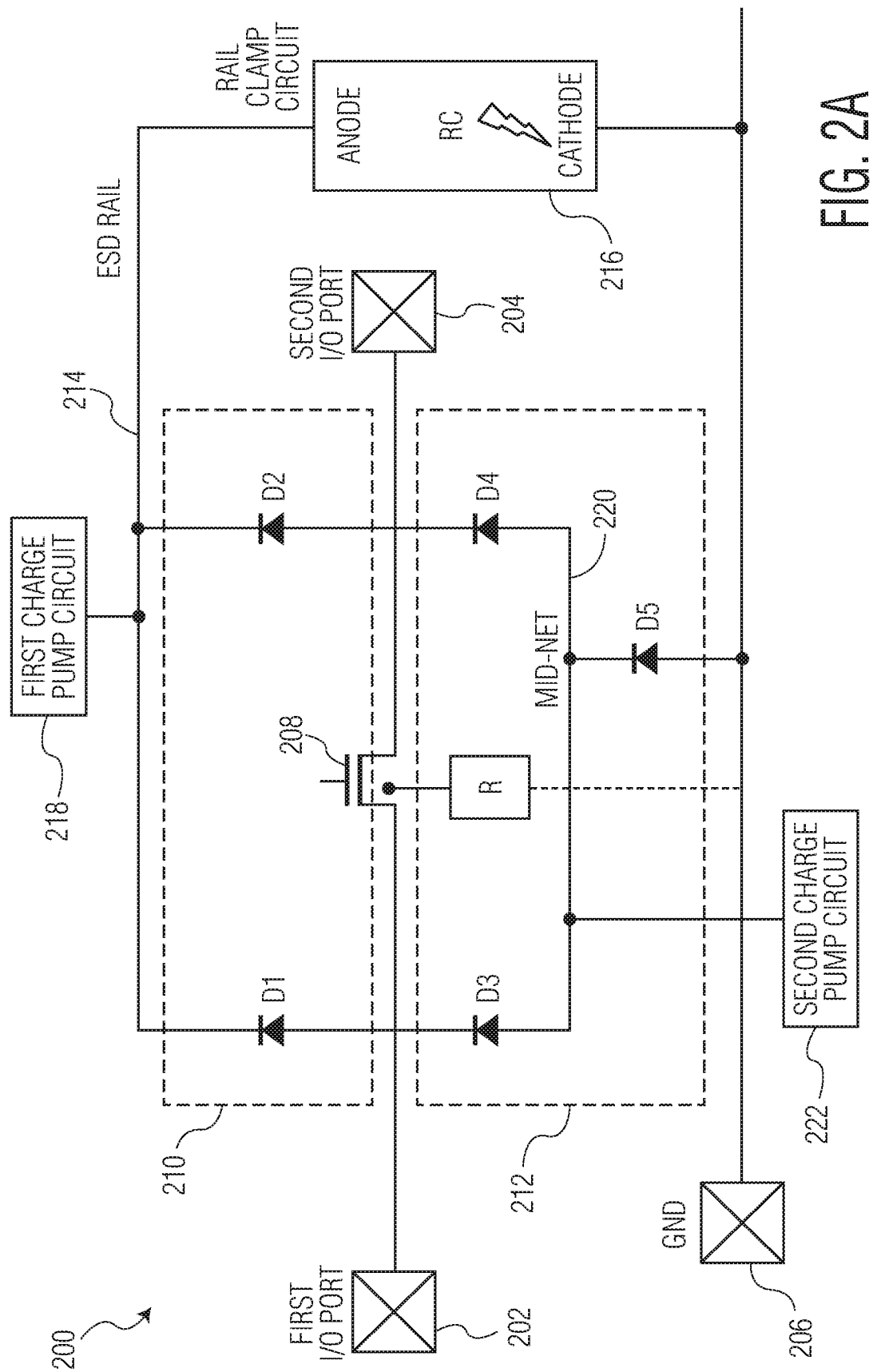
FIG. 2A is a first example voltage limiting device.

FIG. 2A is a first example voltage limiting device 200. The first example voltage limiting device 200 includes a first I/O port 202, a second I/O port 204, a ground (GND) 206, a signaling switch 208, a first voltage limiter 210 (having a first diode (D1) and a second diode (D2)), a second voltage limiter 212 (having a third diode (D3) and a fourth diode (D4) coupled by a mid-net 220 to a fifth diode (D5)), an ESD Rail 214, a rail clamp circuit 216, a first charge pump circuit 218, a second charge pump circuit 222, and configured to be coupled to a set of protected electronics (not shown).

The second voltage limiter 212 is partitioned into two split levels (i.e. an upper portion and a lower portion). Diodes D3 and D4 form the upper portion and diode D5 forms the lower portion. The upper and lower portions are separated by the mid-net 220. Be selectively choosing a "size" of diodes D3, D4 and D5 this "split-level" configuration reduces the equivalent (e.g. parasitic) capacitance at the I/O ports 202, 204, thereby increasing the device's 200 bandwidth and return-loss. Diode D5 is some example embodiments is formed from multiple diodes.

In some example embodiments a resistance (R) coupled to GND 206 (see FIG. 2A) is added to further reduce the equivalent capacitance by floating the body of the signaling switch 208.

In other example embodiments, the second voltage limiter 212 can be partitioned into three or more split levels having additional mid-nets, depending up the application.

The "size" of the diodes is herein defined as the active pn-junction area of the diodes which affects both the diode's current carrying limits and the diode's capacitance. The diodes function as current shunts to route ESD current to either the ESD rail 214 or ground 206.

An equation for an equivalent capacitance (Cequ) of the second voltage limiter 212 is:

$$1/C_{equ} = 1/(C3+C4) + 1/C5,$$

(since D3 and D4 are in parallel and then in series with D5), where:
C3 is the capacitance of diode D3
C4 is the capacitance of diode D4
C5 is the capacitance of diode D5

In an example where diodes D3 and D4 have a same capacitance (i.e. C3=C4) then the following simplified equation is:

$$1/C_{equ} = 1/(2C3) + 1/C5$$

where:
C3 is the capacitance of diodes D3 and D4
C5 is the capacitance of diode D5

Figure 2B:
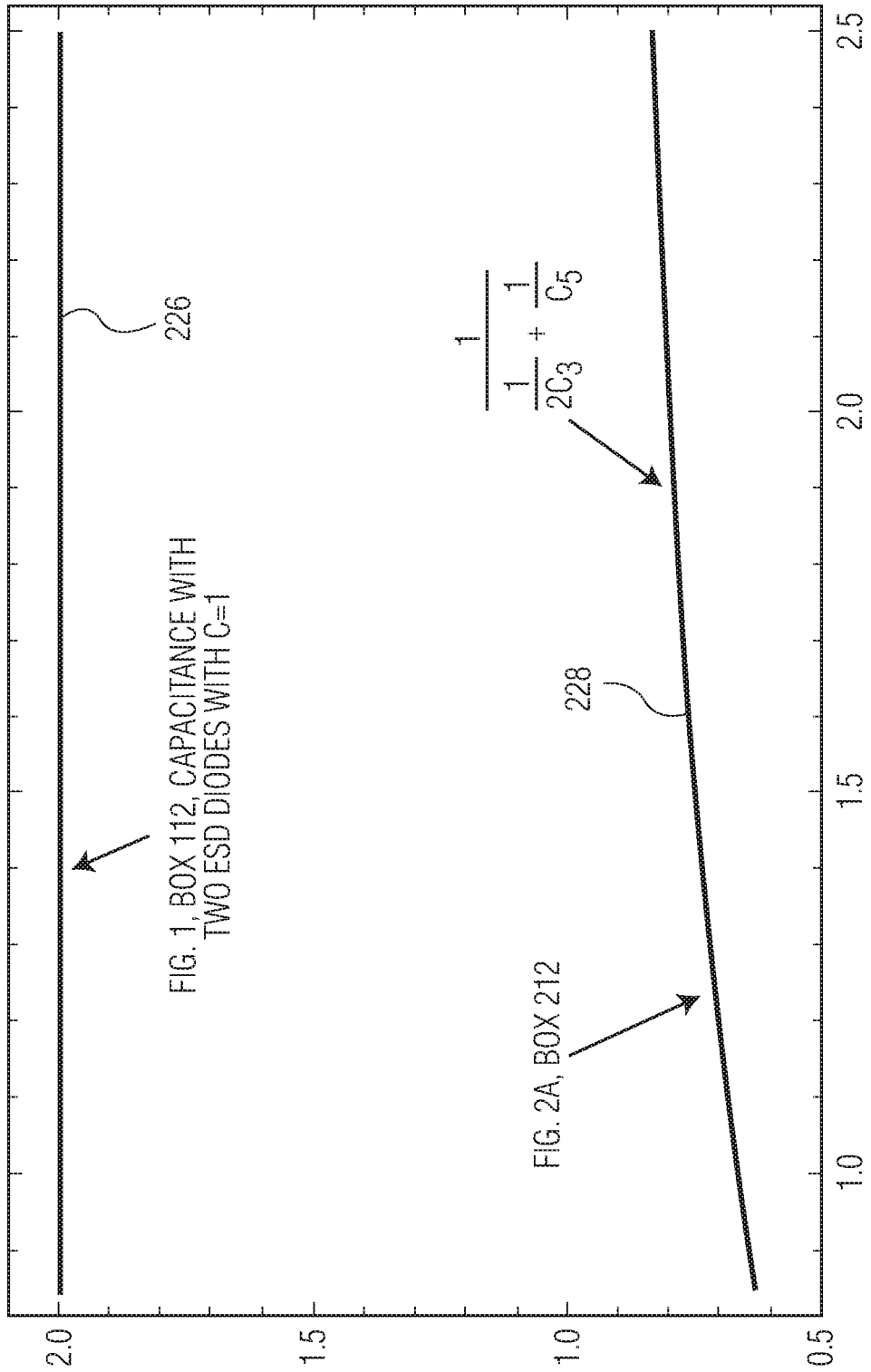
FIG. 2B is an example comparison between an equivalent capacitance of a negative voltage limiter in FIG. 1 and an equivalent capacitance of a second voltage limiter in FIG. 2A.

FIG. 2B is an example 224 comparison between a relative capacitance 226 of the negative voltage limiter 112 in FIG. 1, where C3=C4=1 thus Cequ=1+1=2, and a relative capacitance 228 of the second voltage limiter 212 in FIG. 2A, where C5=1 based on a minimum ESD required size.

If the C3=C4=C5=1, then Cequ is=⅔. If C3=C4=2, and C5=1, then Cequ=0.8. This is a substantial equivalent capacitance improvement with respect to the traditional topology with Ceff=2. The equivalent capacitance of the split-level topology shows a monotonically increasing behavior with increasing capacitance of C3 (=C4). For very large C3 (=C4), C3>>C5, the equivalent capacitance tends to Cequ=1, which is still half the value of the traditional topology with C=2.

FIG. 2C is an example 230 comparison between a relative capacitance 232 of the negative voltage limiter 112 in FIG. 1, where C3=C4=1 thus Cequ=1+1=2, and a relative capacitance 234 of the second voltage limiter 212 in FIG. 2A, where C3=C4=1, and where the capacitance of C5 is varied.

From the example equations above, if the size of diode D3 and D4 are set to the minimum diode size as required by ESD (C3=C4=C5=1), the equivalent capacitance of the split-level topology of FIG. 2A is a factor 3× lower than the traditional topology of FIG. 1 (i.e. Cequ=⅔ for split-level topology and Cequ=2 for traditional topology).

If the signaling switch 208 is configured to shunt some current during an ESD event, (i.e. if a channel is formed in the switch device 208 during an ESD event), then the diode sizes D3 and D4 in FIG. 2A can be reduced further. Both D3 and D4 are then active in an ESD event to the I/O ports 202, 204. This allows for a capacitance reduction exceeding the factor 3× discussed above.

Thus even though the size (i.e. current carrying ability) of D3, D4, and D5 are set by an ESD standards requirement (e.g. HBM or CDM), using the "split-level" topology the equivalent capacitance of the second voltage limiter 212 can still be reduced. Note, HBM (Human Body Model) is used to model an ESD event in an electronic device to human touch, and CDM (Charge Device Model) is used to model an ESD to simulate ESD charging followed by rapid discharge to mimic ESD in an automated handling, manufacturing environment.

While this example's 200 second voltage limiter 212 includes a stack of two diodes (e.g. D3/D5 and D4/D5), other example embodiments can have a greater stack of diodes (e.g. 3, 4, etc.). Such a greater stack of diodes would permit further equivalent capacitance reductions and/or fabrication flexibility, however, additional stacking may limit the ESD performance.

In some example embodiments, the first charge pump 218 is coupled to the cathodes of diodes D1 and D2 of the first voltage limiter 210 and biases the cathodes with a positive voltage which reduces the capacitance added by diodes D1 and D2, since the capacitance of the diodes is lowered when reverse biased.

Also, in some example embodiments, the second charge pump 222 is coupled to the mid-net 220 of the second voltage limiter 212 and biases the mid-net 220 with a negative voltage which reduces the capacitance added by diodes D3 and D4, since the capacitance of the diodes is lowered when reverse biased.

However, the negative voltage of the second charge pump 222 should not bias diode D5 into its reverse breakdown region. The second charge pump 222 is designed to consume minimal current, because diode D5 is conducting when the voltage is pumped more than one voltage drop below ground.

While the first and second voltage limiters 210, 212 have been discussed in terms of diodes, in alternate embodiments gate-grounded NMOS devices, or PNP ESD clamps.

Figure 3:
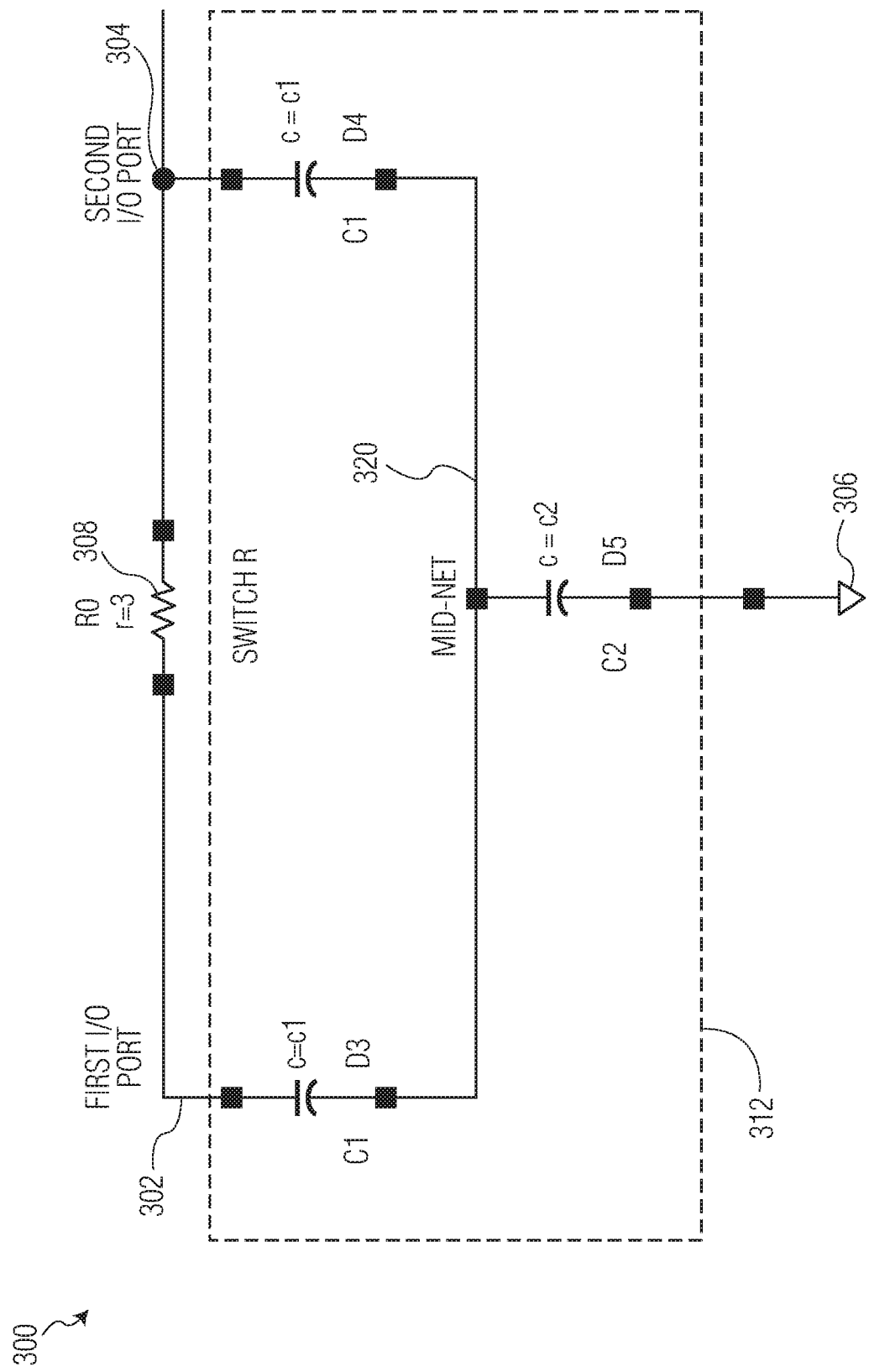
FIG. 3 is a second example voltage limiting device.

FIG. 3 is a second example voltage limiting device 300. The second example voltage limiting device 300 includes a first I/O port 302, a second I/O port 304, a ground (GND) 306, a signaling switch 308 (e.g. MOSFET), a first voltage limiter (not shown) (having a first diode (D1) and a second diode (D2)), a second voltage limiter 312 (having a third diode (D3) and a fourth diode (D4) coupled by a mid-net 320 to a fifth diode (D5)), an ESD Rail (not shown), a rail clamp circuit (not shown).

The second example voltage limiting device 300 presents an equivalent circuit with representative component values to portions of the first example voltage limiting device 200, including the second voltage limiter 212.

Figure 4:
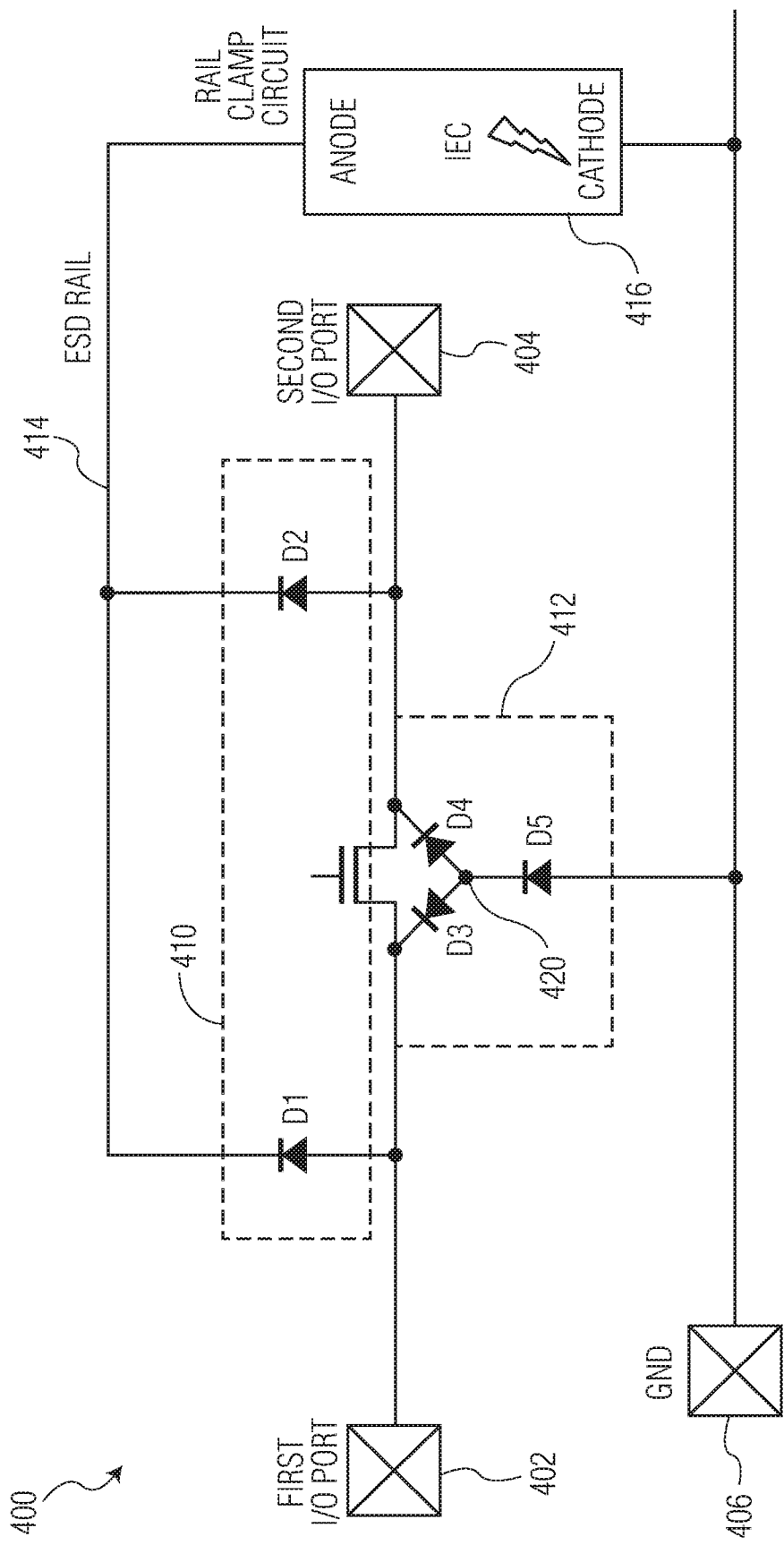
FIG. 4 is a third example voltage limiting device.

FIG. 4 is a third example voltage limiting device 400. The third example voltage limiting device 400 includes a first I/O port 402, a second I/O port 404, a ground (GND) 406, a signaling switch 408, a first voltage limiter 410 (having a first diode (D1) and a second diode (D2)), a second voltage limiter 412 (having a third diode (D3) and a fourth diode (D4) coupled by a mid-net 420 to a fifth diode (D5)), an ESD Rail 414, a rail clamp circuit 416, and configured to be coupled to a set of protected electronics (not shown).

In this example 400, the diodes D3, D4 in the second voltage limiter 412 are formed by an isolated P-doped well (PW) and the N-doped substrate of body-diodes in the signaling switch 408. The signaling switch 408 is embedded in the P-well. Thus diodes D3 and D4 are effectively the body diodes formed by the isolated PW/source and isolated PW/drain junctions.

This example 400 reduces an area required for the second voltage limiter 412 by combining the second voltage limiter 412 with the signaling switch 408 thus only diode D5 is separately placed.

This example 400 reduces the diode's D3, D4 capacitance (because there are no explicit lower diodes at drain and source of the switch 408) thereby further increasing high-speed communications bandwidth and increasing return-loss. The diode's D3, D4 in this example 400 create a capacitive path to GND 406.

Figure 5:
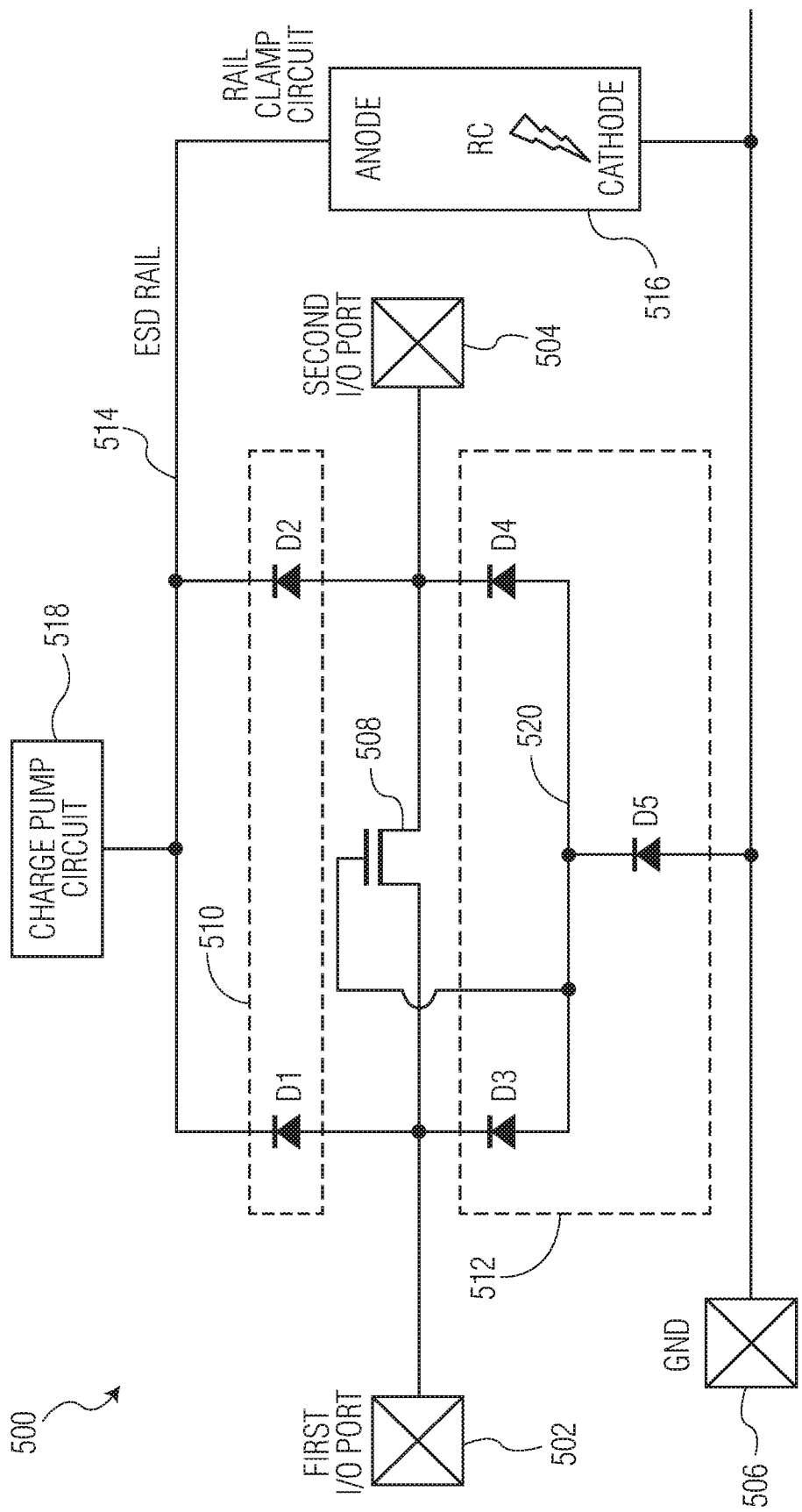
FIG. 5 is a fourth example voltage limiting device.

FIG. 5 is a fourth example voltage limiting device 500. The fourth example voltage limiting device 500 includes a first I/O port 502, a second I/O port 504, a ground (GND) 506, a signaling switch 508, a first voltage limiter 510 (having a first diode (D1) and a second diode (D2)), a second voltage limiter 512 (having a third diode (D3) and a fourth diode (D4) coupled by a mid-net 520 to a fifth diode (D5)), an ESD Rail 514, a rail clamp circuit 516, a first charge pump circuit 518 (apply positive voltage), and configured to be coupled to a set of protected electronics (not shown).

When the signaling switch 508 is a MOSFET and the gate of the MOSFET is opened during an ESD strike, then an additional current shunt channel through the switch 508 is created to shunt ESD current and keep the voltage at the first and second I/O ports 502, 504 within limits.

With this additional current shunt, a size of the upper diodes D3 and D4 in a MOSFET based second voltage limiter 512 can be reduced, since the ESD discharge current can be shared between the additional current channel in the MOSFET and the diodes D3, D4, further reducing the equivalent capacitance at first and second I/O ports 502, 504.

The examples discussed above add only a minimal set of components in order to maintain signal strength by not adding to insertion loss and maintaining signal purity by maintaining or increasing bandwidth of high-speed data communications hardware.

These examples can be used in various applications where higher bandwidth and higher return-loss are needed, such as where an ASIC-based circuit supports USB (e.g. Type-C) signaling, secure authentication, and/or robust power throttling.

Such applications may require robust compliance with IEC (International Electrotechnical Commission) standards for ESD performance, including system level stress (IEC61000-4-2), better surge protection (IEC61000-4-5), higher bandwidth, lower insertion loss, and higher return-loss.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A voltage limiting device, comprising:
a first I/O port;
a second I/O port;
a negative voltage limiter, coupled to the first and second I/O ports, and configured to shunt a negative voltage received on the first and/or second I/O ports having an absolute value greater than a negative voltage limit;
wherein the negative voltage limiter includes a first portion and a second portion;
wherein the first portion includes a first current shunt coupled between the first I/O port and a mid-net, and a second current shunt coupled between the second I/O port and the mid-net; and
wherein the second portion includes a third current shunt having one end coupled to the mid-net and another end coupled to a ground
a positive voltage limiter, coupled to the first and second I/O ports, and configured to shunt a positive voltage received on the first and/or second I/O ports having an absolute value greater than a positive voltage limit;
a signaling switch configured to enable and disable communication signals between the first and second I/O ports.

2. The device of claim 1:
wherein if the voltage received is a negative voltage with reference to the ground, then the negative voltage limiter is configured to shunt the negative voltage received if less than a negative voltage limit.

3. The device of claim 1:
further comprising an ESD rail;
wherein the voltage received is a positive voltage with reference to the ground; and
wherein the positive voltage limiter is configured to shunt the positive voltage received to the ESD rail if greater than the positive voltage limit.

4. The device of claim 3:
further comprising a positive voltage charge pump coupled to the positive voltage limiter and configured to bias the positive voltage limiter with a positive voltage which reduces the capacitance of the positive voltage limiter.

5. The device of claim 1:
wherein the current shunts are diodes.

6. The device of claim 1:
wherein the current shunts are gate-grounded NMOS devices.

7. The device of claim 1:
wherein the current shunts are PNP ESD clamps.

8. The device of claim 1:
wherein the voltage limiting device is an electrostatic discharge (ESD) limiting device.

9. The device of claim 1:
wherein a minimum current carrying size of the current shunts is based on a minimum electrostatic discharge (ESD) protection level of the voltage limiting device.

10. The device of claim 1:
wherein the negative voltage limiter includes an equivalent capacitance based on a ratio of capacitances of the first portion of the negative voltage limiter to the second portion of the negative voltage limiter; and
wherein the ratio of capacitance is a monotonically increasing function with an increasing capacitance of the first portion.

11. The device of claim 1:
wherein a capacitance of the current shunt in the second portion of the negative voltage limiter is greater than capacitances of the current shunts in the first portion of the negative voltage limiter.

12. The device of claim 1:
wherein capacitances of the current shunts in the first portion of the negative voltage limiter are same; and
wherein a capacitance of the current shunt in the second portion of the negative voltage limiter is twice the capacitances of the current shunts in the first portion of the negative voltage limiter.

13. The device of claim 1:
wherein the first and/or second I/O port are configured to be embedded in a USB communications cable.

14. The device of claim 1:
wherein the first and/or second I/O port are configured to be coupled to a set of electronics to be protected from an electrostatic discharge (ESD) strike.

15. The device of claim 1:
wherein the first and second I/O ports are configured to carry bi-directional signals.

16. The device of claim 1:
further comprising a negative voltage charge pump is coupled to the mid-net and configured to bias the mid-net with a negative voltage which reduces the capacitance of the negative voltage limiter.

17. The device of claim 1:
wherein at least one of the current shunts is a diode formed from an isolated P-well in the switch.

18. The device of claim 1:
wherein the signaling switch is a MOSFET and a gate of the MOSFET is configured to be opened when the received voltage is greater than the absolute value of the voltage limit; and
wherein the open gate is configured to create an additional current shunt for reducing the absolute value of the received voltage.

19. The device of claim 1:
further comprising a floating body resistance coupled between the signaling switch and the ground.

20. A voltage limiting device, comprising:
a first I/O port;
a second I/O port;
a voltage limiter, coupled to the first and second I/O ports, and configured to shunt a voltage received on the first and/or second I/O ports having an absolute value greater than a voltage limit;
wherein the voltage limiter includes a first portion and a second portion;
wherein the first portion includes a first current shunt coupled between the first I/O port and a mid-net, and a second current shunt coupled between the second I/O port and the mid-net; and
wherein the second portion includes a third current shunt having one end coupled to the mid-net and another end coupled to a ground;
a signaling switch configured to enable and disable communication signals between the first and second I/O ports;
wherein at least one of the current shunts is a diode formed from an isolated P-well in the switch.

21. The device of claim 1:
wherein the signaling switch forms a communication channel having a bandwidth between the first and second I/O ports; and
wherein the bandwidth of the channel is increased by setting a capacitance of the current shunt in the second portion of the negative voltage limiter as greater than capacitances of the current shunts in the first portion of the negative voltage limiter.

22. The device of claim 1:
wherein the signaling switch is configured to enable communication signals between the first and second I/O ports even during an ESD event.

* * * * *